US012051310B2

(12) United States Patent
Falkenberg et al.

(10) Patent No.: US 12,051,310 B2
(45) **Date of Patent: *Jul. 30, 2024**

(54) ELECTRONIC THEFT-PREVENTING SYSTEM AND METHOD

(71) Applicant: CHECKPOINT SYSTEMS ESPAÑA, S.L.U., Terrassa (ES)

(72) Inventors: Verner Falkenberg, Copenhagen S (DK); Søren Østergaard Sandal, Risskov (DK)

(73) Assignee: CHECKPOINT SYSTEMS ESPANA, S.L.U. (ES)

( * ) Notice: Subject to any disclaimer, the term of this patent is extended or adjusted under 35 U.S.C. 154(b) by 0 days.

This patent is subject to a terminal disclaimer.

(21) Appl. No.: 17/603,755

(22) PCT Filed: Apr. 8, 2020

(86) PCT No.: PCT/EP2020/059983

§ 371 (c)(1),
(2) Date: Oct. 14, 2021

(87) PCT Pub. No.: WO2020/212215

PCT Pub. Date: Oct. 22, 2020

(65) Prior Publication Data

US 2022/0189270 A1 Jun. 16, 2022

(30) Foreign Application Priority Data

Apr. 17, 2019 (DK) ............................ PA201970241

(51) Int. Cl.
*G08B 13/24* (2006.01)
*G08B 25/10* (2006.01)

(52) U.S. Cl.
CPC ..... *G08B 13/2408* (2013.01); *G08B 13/2471* (2013.01); *G08B 25/10* (2013.01)

(58) Field of Classification Search
CPC .............. G08B 13/149; G08B 13/1463; G08B 13/248; G08B 13/24; G08B 29/185; G01V 3/08
See application file for complete search history.

(56) References Cited

U.S. PATENT DOCUMENTS 6,539,327 B1 * 3/2003 Dassot .................. G01V 3/081 702/152
9,981,124 B2 5/2018 Jenison et al.
(Continued)

FOREIGN PATENT DOCUMENTS

CN 101196479 A 6/2008
CN 203325133 U 12/2013
(Continued)

OTHER PUBLICATIONS

International Search Report (two pages) dated Jul. 23, 2020 from PCT priority application PCT/EP2020/059983.
(Continued)

*Primary Examiner* — Mirza F Alam
(74) *Attorney, Agent, or Firm* — McDonald Hopkins LLC

(57) ABSTRACT

An electronic theft-preventing system, including a first and a second multi-axis magnetometer and configured to output first and second vector signals representing movement of first and second magnetic field vectors; and a signal processor receiving the first and second vector signals, and configured to determine a multi-dimensional transformation, in accordance with optimization of a difference between the second vector signal and a compensation signal; wherein the compensation signal is generated from a transformation of the first vector signal in accordance with the multi-dimensional transformation; and generate a compensated second vector signal from the second vector signal and the first compensation signal. Determining that a detector signal meets a predefined criterion; and in response to at least the determining that the detector signal meets the predefined criterion, raising or forgo raising an alarm that warns about a possible theft-related event.

18 Claims, 4 Drawing Sheets

(56) References Cited

U.S. PATENT DOCUMENTS

| | | | | |
|---|---|---|---|---|
| 2005/0256388 | A1 | 11/2005 | Susi | |
| 2006/0197523 | A1* | 9/2006 | Palecki | G01V 3/081<br>324/244 |
| 2007/0080806 | A1* | 4/2007 | Lax | G08B 13/19669<br>340/572.1 |
| 2010/0219951 | A1* | 9/2010 | Sosa | B60R 25/1004<br>340/3.1 |
| 2011/0285392 | A1* | 11/2011 | Deng | G01V 3/081<br>324/248 |
| 2013/0289384 | A1 | 10/2013 | Jenison et al. | |
| 2016/0093183 | A1 | 3/2016 | Falkenburg et al. | |

FOREIGN PATENT DOCUMENTS

| | | | |
|---|---|---|---|
| CN | 104379211 | A | 2/2015 |
| CN | 109521384 | A | 3/2019 |
| EP | 2 997 557 | B1 | 6/2017 |
| WO | WO 2014/184192 | A1 | 11/2014 |
| WO | WO 2019/072716 | A1 | 4/2019 |

OTHER PUBLICATIONS

Written Opinion of the International Search Authority (eight pages) dated Jul. 23, 2020 from PCT priority application PCT/EP2020/059983.

First Office Action (12 pages) dated Nov. 14, 2022 from corresponding Chinese Patent Application 2020800293538.

* cited by examiner

ELECTRONIC THEFT-PREVENTING SYSTEM AND METHOD

This application is a national application out of Patent Cooperation Treaty Patent Application No. PCT/EP2020/059983, filed on Apr. 8, 2020, the entire contents of which are incorporated herein by reference.

This application claims under 35 U.S.C. § 119(a) the benefit of the filing date of Denmark Patent Application No. PA201970241, filed on Apr. 17, 2019, the entire contents of which are incorporated herein by reference.

BACKGROUND OF THE INVENTION

Field of the Invention

Theft, also known as shoplifting, is a problem for many retailers—especially for those who sell those consumer goods such as apparel, clothes that are relatively easy to hide under a coat, in a handbag or the like—especially if fitting rooms are available.

Electronic article surveillance, EAS, is known in the art to trigger an alarm and possibly prevent goods being removed from a shop or shopping area in an unauthorized way.

In accordance with conventional EAS systems, a salesperson attach an electromagnetic tag to the goods, e.g. to the more expensive ones of the goods. Antennas are placed near the entrance/exit(s) to/from the shop or shopping area and are coupled to an electric circuit that detects passing tags attached to goods. Normally the tags are removed when the goods are paid for at the cashier. So, when a passage of a tag between the antennas is detected it is usually a theft-related event.

Despite such systems being widely installed, in almost every store e.g. those selling clothes or even those selling foodstuff, theft is still a huge problem for the retailers.

It is realized that people who intends to perform theft enters the shop or shopping area with a magnet configured to unlock the lock that keeps the above-mentioned tag attached to the goods. Then, in the shop, they remove the tag from the goods and leave the tag behind. They then take the goods out of the shop without triggering any alarm by conventional EAS alarm systems.

Such a magnet, configured to unlock the lock that attaches the above-mentioned tag to the goods, is denoted a detacher, a detacher magnet or unlock magnet. However, it is difficult to detect such a detacher magnet since it is easily confused with other magnetic objects present and even moving about in and around a shopping area. Magnets may be used in locks for bags and metal parts in e.g. shoes or bags may appear as magnets.

A problem is then that automatic detection easily generates either false alarms or doesn't detect a magnet when it should. In this respect it should be noted that false alarms are seriously disliked by the sales personnel and the customers who risk getting erroneously accused of theft.

RELATED PRIOR ART

EP 2 997 557 B1 relates to automatically detecting when a detacher magnet enters the shop or shopping area and describes an electronic theft-preventing system giving an alarm when a strong magnet as used in a detacher enters a shopping area. The electronic theft-preventing system comprises a first and second multi-axis magnetometer arranged in a first and second station and configured to output a first and second vector signal representing movement of a first and second magnetic field vector, respectively; and a signal processor coupled to receive the first and second vector signals, and configured to:

estimate a first rotation of the first magnetic field vector and a second rotation of the second magnetic field vector; generate an indicator signal comprising indication of a counter-direction rotation or a same-direction rotation; and determining whether to issue or inhibit an alarm signal that warns about a possible theft-related event in response to at least the indicator signal. The system warns if an unlock magnet for an anti-shoplifting tag pass between the stations e.g. when the stations are located at each respective side of an entrance to a shopping area.

It is observed that in some locations and sometimes it is a problem to reliably detect theft related events by existing systems, e.g. systems that detect detacher magnets. Hence, existing systems either generate false alarms or fails to raise an alarm at times when the alarm should have been raised. It is also observed that conventional time-domain filtering may be sufficient in some situations, but not in all situations.

SUMMARY

It is observed that in some locations and sometimes it is a problem to reliably detect theft related events by existing systems, e.g. systems that detect An electronic theft-preventing system, including:

a first multi-axis magnetometer (101) arranged in a first station at a first position and configured to output a first vector signal (vs0) representing movement of a first magnetic field vector;

a second multi-axis magnetometer (102; 104) arranged in a second station at a second position and configured to output a second vector signal (vs1; vs3) representing movement of a second magnetic field vector; and a signal processor (501) coupled to receive the first vector signal (vs0) and the second vector signal (vs1), and configured to:

- determine first values of parameters, of a first multi-dimensional transformation (C1), in accordance with optimization of a difference between the second vector signal (vs1) and a first compensation signal (cs1); wherein the first compensation signal (cs1) is generated from a transformation of the first vector signal (vs0) in accordance with the first multi-dimensional transformation (C1);
- generate a compensated second vector signal (cvs1) from the second vector signal (vs1) and the first compensation signal (cs1);
- determine that a detector signal (D), which is responsive to the compensated second vector signal, meets a predefined criterion; and
- in response to at least the determining that the detector signal meets the predefined criterion, raising or forgo raising a first alarm that warns about a possible theft-related event.

Thereby it is possible to more reliably detect theft related events and to at least reduce the risk of generating false alarms or failing to raise an alarm at times when the alarm should have been raised.

In particular, but not limited thereto, it is possible to reliably detect the theft-related event despite the presence of disturbing magnetic fields emitted by high-power electromagnetic installations. The high-power electromagnetic installations may be associated with e.g. overhead contact lines in connection with railways, metro lines, trams etc.

Disturbances from e.g. high-power electromagnetic installations may be suppressed in the compensated second vector signal using the first compensation signal, which is obtained via the first transformation and information in the first vector signal. The first transformation may accommodate e.g. one or both of a rotation transformation and a scale transformation. The first transformation may represent a difference between the first magnetic field vector and the second magnetic field vector.

The first multi-axis magnetometer can be placed at a distance, in the range of meters e.g. 1-20 meters, from the second multi-axis magnetometer. In accordance with the claimed system, spatial information related to a disturbing magnetic field is included in the first transformation since the first magnetometer senses the magnetic field at the position of the first station, which is at a different position than the second station. The first vector signal is acquired at a different position than the second vector signal. The second multi-axis magnetometer can be placed at a position proximate to an area, such as an entrance area, a fitting room area or a passage way, at which it is desired to detect a theft-related event. The first multi-axis magnetometer can be placed closer to a magnetic field source, such as overhead contact lines for a train, metro or bus line and/or at a location where customers are not expected to pass, at least not often.

Thus, the signal processor is enabled to more effectively filter out disturbances from electromagnetic installations compared to conventional time domain filtering. It has been found that the claimed system is able to sufficiently suppress effects of the disturbing magnetic fields to more reliably detect theft related events despite the presence of electromagnetic installations emitting strong electromagnetic fields.

The second multi-axis magnetometer may sense a theft-related event alone or in combination with one or more additional multi-axis magnetometers e.g. in combination with the first multi-axis magnetometer.

The compensated second vector signal is compensated using information from the first multi-axis magnetometer. In particular, a first multi-dimensional transformation is applied to render the first vector signal useful for compensating the second vector signal.

In some embodiments the first values of the parameters, of the first multi-dimensional transformation (C1), are determined on a recurring basis in accordance with first timing (T1, T2, T3).

Thereby it is possible to reliably detect the theft-related event despite the presence of time-varying disturbing magnetic fields emitted by high-power electromagnetic installations. For instance, it is observed that time-varying disturbing magnetic fields emitted by e.g. overhead contact lines in connection with railways, metro lines, trams etc. draws shifting levels of essentially DC currents. Such time-varying disturbing magnetic fields alternates at regularly or irregularly and may occur at frequencies related to theft-related events taking place near the second station.

In some aspects, in response to the first values of the parameters being determined anew, on the recurring basis in accordance with the first timing, the compensated second vector signal is generated from the second vector signal in accordance with the first values determined anew on the recurring basis. Thus, most recent first values are used for the compensation.

The first values of the parameters, of the first multi-dimensional transformation, may be determined at regular intervals e.g. every 30 seconds, every 60 seconds, every 3 minutes or at other regular or irregular intervals.

In some embodiments the difference between the second vector signal (vs1) and the first compensation signal (cs1) is determined over concurrent time segments of the first vector signal (vs0) and the second vector signal (vs1) or portions of the concurrent time segments; and the compensated second vector signal (cvs1) is generated from the second vector signal (vs2) at times subsequent to the concurrent time segments and in accordance with the first values determined anew on the recurring basis.

Thereby, compensation is based on most recent first values of the parameters of the first transformation and the compensated second vector signal is adapted to a changing disturbing magnetic field more quickly.

The concurrent time segments (i.e. current time segments) may overlap or be non-overlapping or consecutive or non-consecutive with previous concurrent time segments.

In some embodiments the electronic theft-preventing system includes;

a third multi-axis magnetometer (103; 105) arranged in a third station and configured to output a third vector (vs2) signal representing movement of a third magnetic field vector;

wherein the signal processor (501) is further configured to:

determine second values of parameters, of a second multi-dimensional transformation (T2), in accordance with optimization of a difference between the third vector signal ($A_3$) and a second compensation signal (cs2); wherein the second compensation signal (cs2) is generated from a transformation of the first vector signal (vs0) in accordance with the second multi-dimensional transformation (C2);

generate a compensated third vector signal (cvs2) from the third vector signal (vs2) and the second compensation signal (cs2);

wherein the detector signal (D) is responsive to the compensated third vector signal (cvs2).

The second multi-axis magnetometer and the third multi-axis magnetometer may be positioned on each side of a passage way e.g. a passage way to a shopping area or a passage way to a fitting room.

The second station and the third station may thus be positioned on opposite sides of passage way. The first station may be positioned at a first distance from any of the second station and the third station, wherein the first distance is greater, e.g. at least double, than the distance between the second station and the third station.

The second values and the third values of the respective transformations may be different despite the distance between the second and first station is comparatively small. For instance, the first magnetometer may have a different orientation than then one or both of the second magnetometer and the third magnetometer. Also it may happen that one or more of the magnetometers orientation is changed intentionally or unintentionally.

One or both of the compensated second vector signal and the compensated third vector signal may be processed to raise or forgo to raise an alarm that warns about a possible theft-related event. This is described in more detail in EP 2997557 B2 in connection with a passage way and in application PCT/EP2018/077148 in connection with a fitting room.

In some embodiments the electronic theft-preventing system includes;

a fourth multi-axis magnetometer (104; 106) arranged in a fourth station and configured to output a fourth vector (vs3; vs5) signal representing movement of a fourth magnetic field vector;

wherein the signal processor is further configured to:

determine third values of parameters, of a third multi-dimensional transformation (C3), in accordance with optimization of a difference between the fourth vector signal (vs3) and a third compensation signal; wherein the second compensation signal is generated from a transformation of the first vector signal (vs1) in accordance with the third multi-dimensional transformation (C3);

generate a compensated third vector signal from the third vector signal and the second compensation signal;

wherein the detector signal (D) is responsive to the compensated third vector signal.

One or more or all of the compensated second vector signal, the compensated third vector signal and the compensated fourth vector signal may be processed to raise or forgo to raise an alarm that warns about a possible theft-related event. This is also described in more detail in EP 2997557 B2 in connection with a passage way and in application PCT/EP2018/077148 in connection with a fitting room.

In some embodiments the signal processor is further configured to band-pass filter one or more or all of the first vector signal, the second vector signal, the third vector signal and the fourth vector signal by respective band-pass filters; wherein the respective band-pass filters have a lower cut-off frequency below 1.0 Hz and an upper cut-off frequency above 4 Hz and below 50 Hz.

The band-pass filter may effectively remove offsets corresponding to the earth's magnetic field and AC noise e.g. from electrical appliances, motors etc. occurring at frequencies above 4 Hz to above 50 Hz.

In some aspects band-pass filtering is applied to provide the vector signals as band-pass filtered vector signals. Thus, the vector signals mentioned above may be band-pass filtered vector signals. This improves effectiveness of the compensation since the transformation can be more accurately estimated when offsets corresponding to the earth's magnetic field and AC noise e.g. from electrical appliances is removed in advance.

The band-pass filter(s) may be implemented by low-pass filter and a high-pass filter or by a first low-pass filter and a second low-pass filter coupled via a summing unit to output a difference signal as it is known in the art.

In some embodiments one or more or all of: the first multi-dimensional transformation (C1), the second multi-dimensional transformation (C2), and the third multi-dimensional transformation (C3) are estimated in accordance with a regularization, applied during iterative estimation of parameters of the transformation, penalizing relatively large parameters of the parameters of the transformation compared to relatively small parameters of the parameters of the transformation.

The regularization prevents or inhibits overfitting. This is expedient since typically one direction of the magnetic field vectors in three-dimensional space is much stronger than in the other directions. This helps inhibiting overfitting in the other directions. The regularization may be L1 regularization or L2 regularization or another type of regularization. The regularization constrains (regularizes) the coefficient estimates towards zero. In other words, this technique discourages learning a more complex or flexible model, so as to avoid the risk of overfitting.

In some embodiments the first vector signal (vs0) is acquired at a first time segment (TS1) and a second time segment (TS2) and the second vector signal (vs1) is acquired at the first time segment (TS1) and the second time segment (TS2); the first parameters (C1) are estimated a first time (T1) from the first vector signal (vs0) and the second vector signal (vs1) at the first time segment (TS1); the first parameters (C1') are estimated a second time (T2) from the first vector signal and the second vector signal at the second time segment; the compensated second vector signal (cvs1) is generated, at times following the second time (T2) in accordance with the first parameters (C1), estimated at the first time (T1), subject to a first criterion; and the compensated second vector signal is generated, at times following the second time (T2) in accordance with the first parameters (C1'), estimated at the second time (T2), subject to a second criterion.

In this way the system may adapt to improved parameters which may be estimated on an ongoing basis. The first time segment and the second time segment may be consecutive time segments e.g. having a duration of 30-120 seconds or shorter or longer. The first time segment and the second time segment may be overlap in time or be spaced apart to occur at regular or irregular times.

In some embodiments the first criterion is fulfilled when the compensated second vector signal (cvs1) generated from the second vector signal (vs1) at the first time segment (TS2) in accordance with the first parameters (C1') estimated the second time (T2) has a lower strength than the compensated second vector signal (csv1) generated from the second vector signal (vc1) at the first time segment in accordance with the first parameters (C1) estimated at the first time (T1).

The strength thus provides a measure and mutual threshold for evaluating whether to update or keep parameters over time. The system can thus adapt to changing magnetic fields over time and/or to relocation and/or rotation of the stations and/or magnetometers relative to each other. This greatly lowers a frequency of service attendance to the system and serves to further reduce the frequency of false alarms or failures to raise an alarm at times when the alarm should have been raised.

In some embodiments, at a first time: the first parameters (C1) are estimated based on: the first vector signal (vs0) at a first time segment (TS1), the second vector signal (vs1) at the first time segment (TS1) and the first compensation signal at the first time segment (TS1); wherein the first compensation signal at the first time segment (TS1) is generated from the first parameters (C1) estimated the first time (T1) and the first vector signal (vs0) at the first time segment (TS1);

at a second time: the first parameters (C1') are estimated based on: the first vector signal (vs0) at a second time segment (TS2), the second vector signal (vs1) at the second time segment (T2) and the first compensation signal at the second time segment; and the first compensation signal is generated from the first parameters (C1') estimated the second time and the first vector signal at the second time segment; a first compensated second vector signal (cvs1) is generated from the second vector signal (vs1) at the second time segment (TS2) and the first compensation signal is generated from the first parameters (C1) estimated the first time and the first vector signal at the second time segment; a second compensated second vector signal (cvs1') is generated from the second vector signal (vs1) at the second time segment and the first compensation signal is generated from the first parameters (C1') estimated the second time and the first vector signal at the second time segment; the signal processor being further configured to:

evaluate the first compensated second vector signal (cvs1) and the second compensated second vector signal, and determine that the first compensated second vector signal (cvs1) is favoured over the second compensated second vector signal (cvs1'), and generate the compensated second vector signal (cvs1) in accordance with the first parameters estimated the first time and forgo to generate the compensated second vector signal in accordance with the first parameters estimated the second time.

In some embodiments the signal processor (501) is further configured to perform the detection of a corresponding movement of the first magnetic field vector and the second magnetic field vector by:

- estimating a first rotation of the first magnetic field vector and a second rotation of the second magnetic field vector;
- generating an indicator signal comprising indication of a counter-direction rotation or a same-direction rotation;
- determining whether to enable the first alarm in response to at least the indicator signal.

This is also described in more detail in EP 2997557 B2 in connection with a passage way.

In some embodiments the signal processor is further configured to:

- detect a corresponding movement of the first magnetic field vector and the second magnetic field vector;
- subsequent to the detecting of a corresponding movement of the magnetic field vectors, detecting commencement and continuance of fluctuation of at least the first magnetic field vector or the second magnetic field vector; wherein continuance of the fluctuation is determined in accordance with a first timing criterion;
- determining whether to raise or forgo to raise a first alarm that warns about a possible theft-related event in response to at least the determining of commencement and continuance of fluctuation of at least the first magnetic field vector or the second magnetic field vector.

In some embodiments detection of a corresponding movement of the first magnetic field vector and the second magnetic field vector includes:

- determining whether movement of the first magnetic field vector and the second magnetic field vector correspond to a substantially horizontal movement of a magnet between the first station and the second station.

In some embodiments detecting continuance of fluctuation includes:

- determining whether movement of one or both of the first magnetic field vector and the second magnetic field vector correspond to an oscillating movement of a magnet in proximity of one or both of the first station or in proximity of the second station.

This is also described in more detail in application PCT/EP2018/077148 in connection with a fitting room.

There is also provided a method of detecting a theft-related event, at a system comprising: a first multi-axis magnetometer arranged in a first station and configured to output a first vector signal representing movement of a first magnetic field vector; a second multi-axis magnetometer arranged in a second station and configured to output a second vector signal representing movement of a second magnetic field vector; and a signal processor coupled to receive the first vector signal and the second vector signal: including:

- estimating a first multi-dimensional transformation ($C_n$), which represents a difference between the first magnetic field vector and the second magnetic field vector, and which is estimated over periods of time in accordance with optimization of a difference between the first vector signal and the second vector signal;
- compensating the second vector signal in response to a first compensation signal generated from a transformation of the second vector signal defined by the first multi-dimensional transformation ($C_n$);
- determine that a detector signal (D), which is responsive to the compensated second vector signal, meets a predefined criterion; and
- in response to at least the determining that the detector signal meets the predefined criterion, raising or forgo raising a first alarm that warns about a possible theft-related event.

BRIEF DESCRIPTION OF THE FIGURES

A more detailed description follows below with reference to the drawing, in which.

DETAILED DESCRIPTION

The electronic theft-preventing system is described below with respect to different embodiments including at least a first multi-axis magnetometer 101 and a second multi-axis magnetometer 102; 104. In general, the first multi-axis magnetometer 101 is arranged in a first station at a first position and configured to output a first vector signal, vs0, representing movement of a first magnetic field vector. The second multi-axis magnetometer, which is designated e.g. by 102 is 104, is arranged in a second station at a second position and configured to output a second vector signal, vs1; vs3, representing movement of a second magnetic field vector. The magnetic field vectors refer to a representation of the physical magnetic field sensed by the respective magnetometers. In general, herein the magnetometers are shown with a Cartesian coordinate system with axes x, y and z. The magnetometers may be inclined relative to each other, albeit not shown this way herein. Magnetometer components may include a mark or symbol printed on their surface to represent orientation of its axes.

A signal processor—described further below—is coupled to receive the first vector signal, vs0, and the second vector signal, vs1. The signal processor is configured e.g. with one or more processors running a program to generate at least one compensated vector signal and to determine that a detector signal, which is responsive to the compensated vector signal, meets a predefined criterion; and in response to at least the determining that the detector signal meets the predefined criterion, raising or forgo raising a first alarm that warns about a possible theft-related event. In some embodiments the signal processor is coupled to receive additional one or more vector signals e.g. vs2 and vs3. In some embodiments multiple signal processors are used, each coupled to receive two or more vector signals. The vector signals may be transmitted from the respective stations by a wireless or wired connection to the signal processor. Also, the one or more signal processors may be coupled by a wireless or wired connection to an alarm emitter e.g. to a mobile alarm emitter.

Herein the vector signals are digital vector signals comprising values including a collection of three sample values (e.g. designated $x_i$, $y_i$ and $z_i$); one per dimension of three mutually orthogonal dimensions e.g. x, y and z. The magnetometers may be of a digital type outputting digital values or of an analogue type outputting analogue signals which are subsequently converted to digital vector signals by an analogue-to-digital converter. The digital signals may be communicated in accordance with the I2C standard, a Bluetooth standard or in accordance with another protocol.

Before turning to the details of the signal processor, configurations of systems of multi-axis magnetometers arranged in respective stations at respective positions and configured to output respective vector signals are described.

Figure 1:
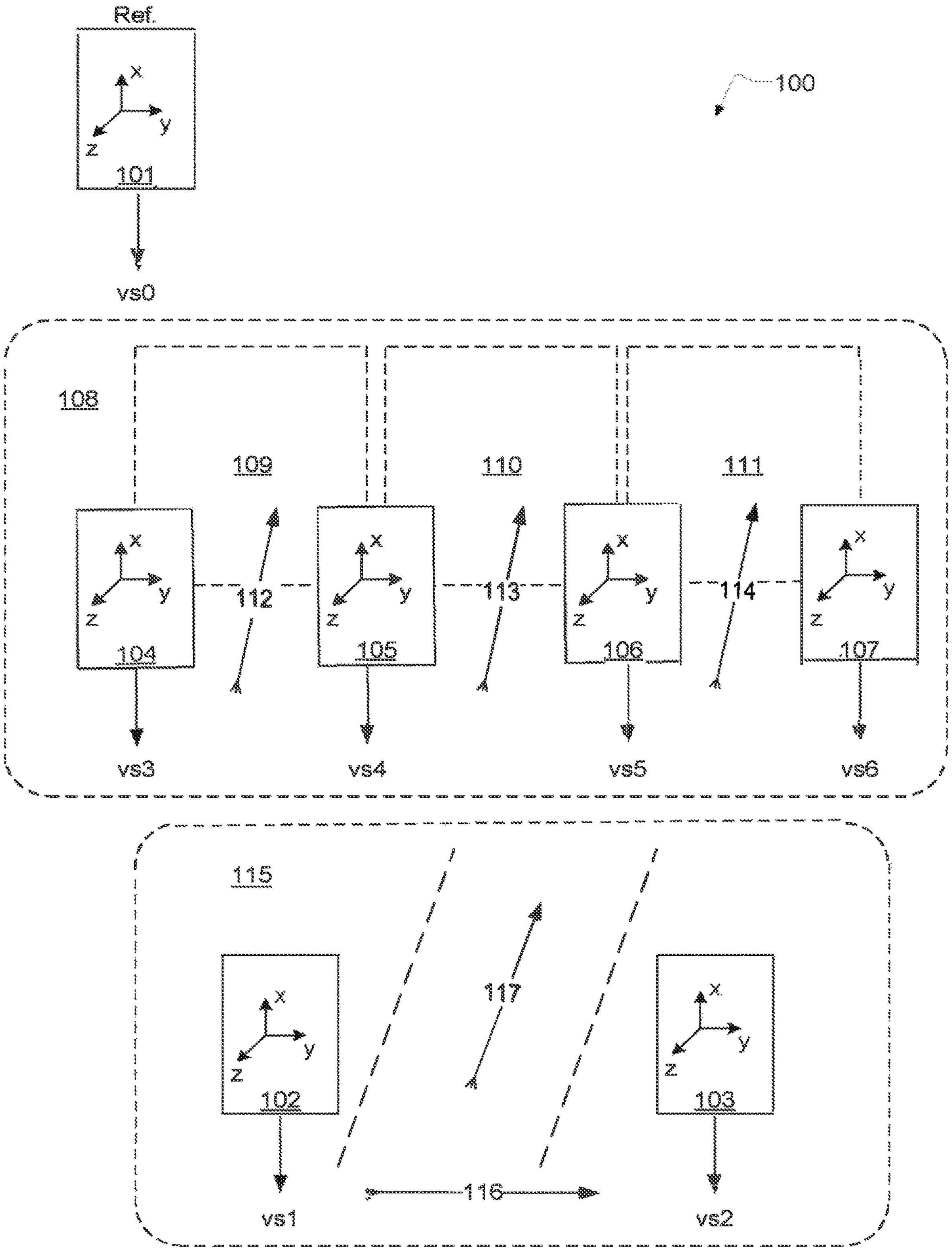
FIG. 1 illustrates magnetometers of a theft-preventing system, e.g. installed at an entrance area and a fitting room area, of a shopping area.

FIG. 1 illustrates an example of a system of magnetometers of a theft-preventing system, e.g. installed at an entrance area and a fitting room area, of a shopping area. The system 100 of magnetometers includes:

i) the first multi-axis magnetometer 101, outputting the first vector signal vs0;
ii) a first group 115 of magnetometers 102 and 103 outputting respective vector signals vs1 and vs2; and
iii) a second group 108 of magnetometers 104, 105, 106 and 107.

The first group 115 of magnetometers 102 and 103 may be arranged at opposite sides of a passage illustrated by arrow 117, which may be an entrance to a shopping area, such that people entering the shopping area passes between the magnetometers 102 and 103. The passage between the magnetometers may also be designated a 'gate'. People passing by, without entering the shopping area via the gate, may pass along arrow 116. As described in more detail in EP 2997557 B2 it is possible to determine that a person carries a detacher magnet (or a magnetically similar object) through the gate along arrow 117 or to determine that the person carrying a detacher magnet passes by along arrow 116. One or more 'gates' may be installed in this way. One or more magnetometers may be used for two neighbouring gates to reduce the number of magnetometers required.

The second group 108 of magnetometers 104, 105, 106 and 107 may be arranged at a fitting room area e.g. of the shopping area. In some embodiments at least one magnetometer is required per fitting room to distinguish for which fitting room to raise an alarm in case of detection of a theft-related event. The fitting rooms are designated 109, 110 and 111 and can be entered via respective passages as indicated by arrows 112, 113 and 114. Here, the magnetometers 104, 105, 106 and 107 are arranged to form gates at the entrance to each fitting room. As described in more detail in EP 2997557 B2 it is thus possible to determine that a person carries a detached magnet into a fitting room. As described in more detail in patent application PCT/EP2018/077148 it is possible to determine whether a predetermined and possibly theft-related movement of a detacher magnet takes place in a given fitting room.

Importantly, the system of magnetometers includes comprises the first multi-axis magnetometer 101. The first multi-axis magnetometer 101 is positioned at a distance, e.g. in the range of meters e.g. 1-20 meters, from a second multi-axis magnetometer. Here the second multi-axis magnetometer may be any of the magnetometers 102, 103, 104, 105, 106, or 107. The magnetometers of the first group 108 may be positioned e.g. at a mutual distance of about 0.5 to 2 meters or more or less e.g. depending on the size of the fitting rooms. The magnetometers of the second group 115 may be positioned e.g. at a mutual distance of about 1 to 4 meters or more or less e.g. depending on where other alarm stations are positioned relative to an entrance. The first multi-axis magnetometer 101 can be placed closer to a magnetic field source, such as overhead contact lines for a train, metro or bus line and/or at a location where customers are not expected to pass, at least not often.

The system of magnetometers may comprise fewer or more groups of magnetometers to obtain desired one or more detection zones or gates.

Figure 2:
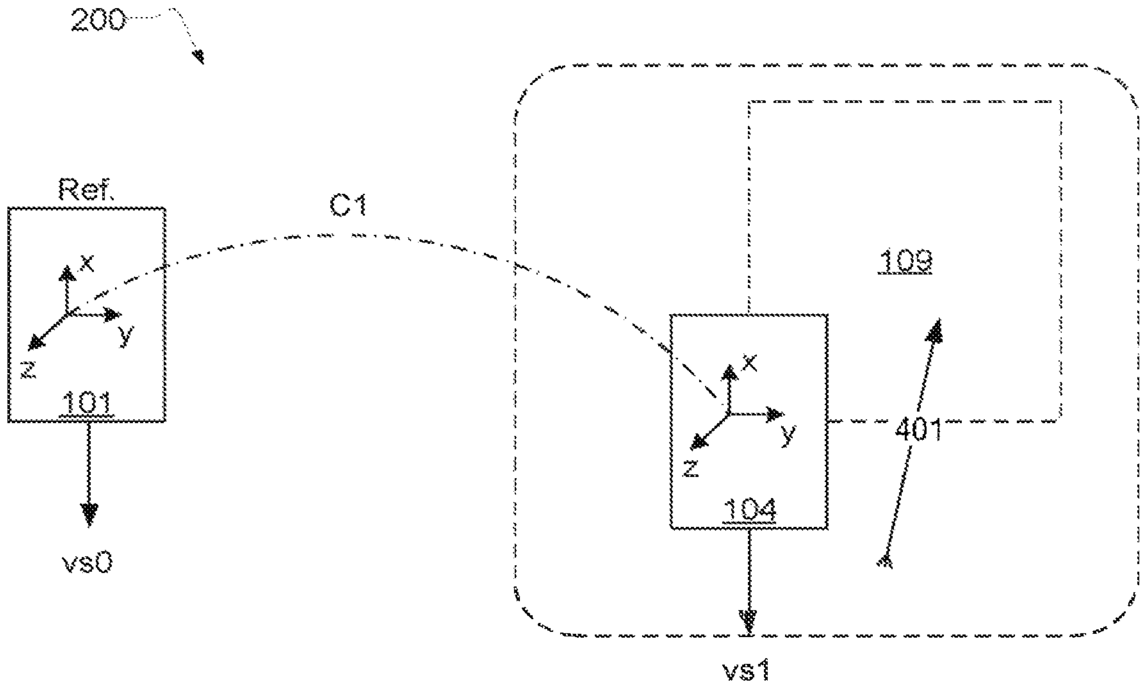
FIG. 2 illustrates magnetometers of a theft-preventing system, e.g. installed at a fitting room area, including a first magnetometer and a second magnetometer.

FIG. 2 illustrates an example of a system of magnetometers of a theft-preventing system, e.g. installed at a fitting room area, comprising a first magnetometer and a second magnetometer. The system 200 of magnetometers includes the first magnetometer 101 and the second magnetometer 104. The system 200 may be used in connection with e.g. the fitting room 109. Thus a much simpler system is provided. The system may be implemented as described in patent application PCT/EP2018/077148.

As will described in more detail further below, for this system 200 of magnetometers, the signal processor is configured to compute values of parameters, of a first multi-dimensional transformation, C1, and to generate a compensated second vector signal from the second vector signal, vs1, the first vector signal, vs0, and the first transformation, C1. The transformation C1 is illustrated by a dashed line designated C1.

Figure 3:
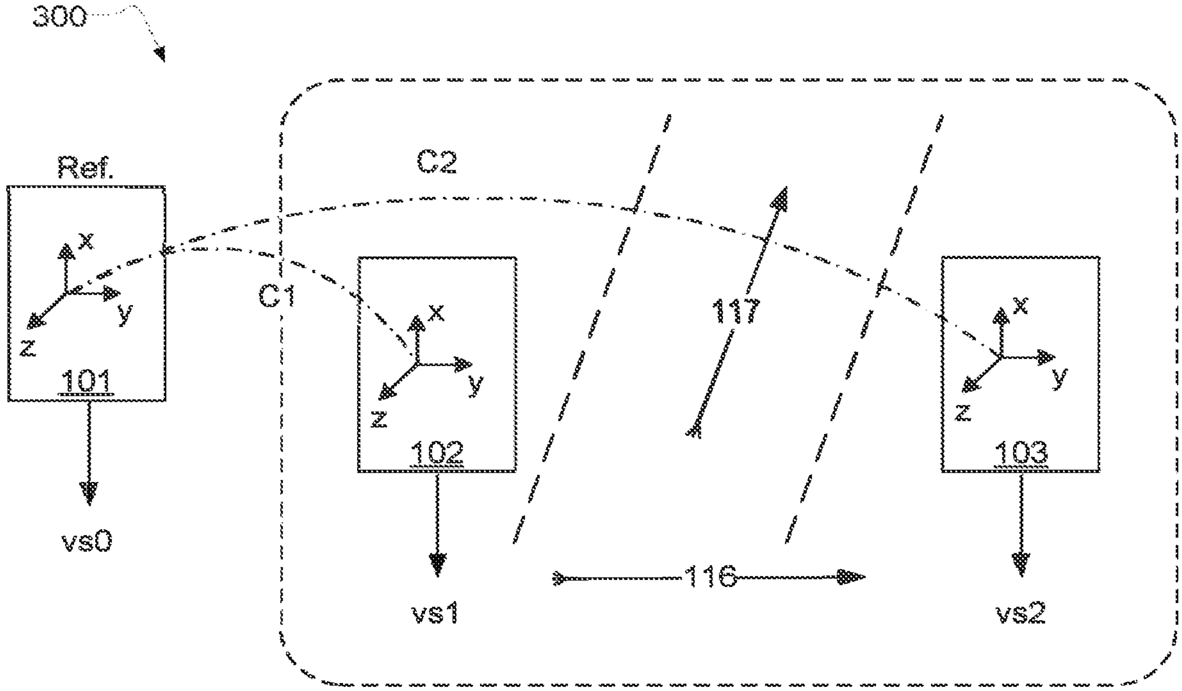
FIG. 3 illustrates magnetometers of a theft-preventing system, e.g. installed at an entrance area, including a first magnetometer, a second magnetometer and a third magnetometer.

FIG. 3 illustrates an example of a system of magnetometers of a theft-preventing system, e.g. installed at an entrance area, including a first magnetometer, a second magnetometer and a third magnetometer. The system 300 of magnetometers includes the first magnetometer 101, the second magnetometer 102 and a third magnetometer 103. The system 300 may be used in connection with e.g. one or both of an entrance area and a fitting room.

For this system 300 of magnetometers, the signal processor is configured to compute values of parameters, of a first multi-dimensional transformation, C1, and values of parameters, of a second multi-dimensional transformation, C2. Further, the signal processor is configured to generate:

i) a compensated second vector signal from the second vector signal, vs1, the first vector signal, vs0, and the first transformation, C1; and
ii) a compensated third vector signal from the third vector signal, vs2, the first vector signal, vs0, and a second transformation, C2.

The transformations C1 and C2 are illustrated by the dashed line designated C1 and the dashed line designated C2.

Figure 4:
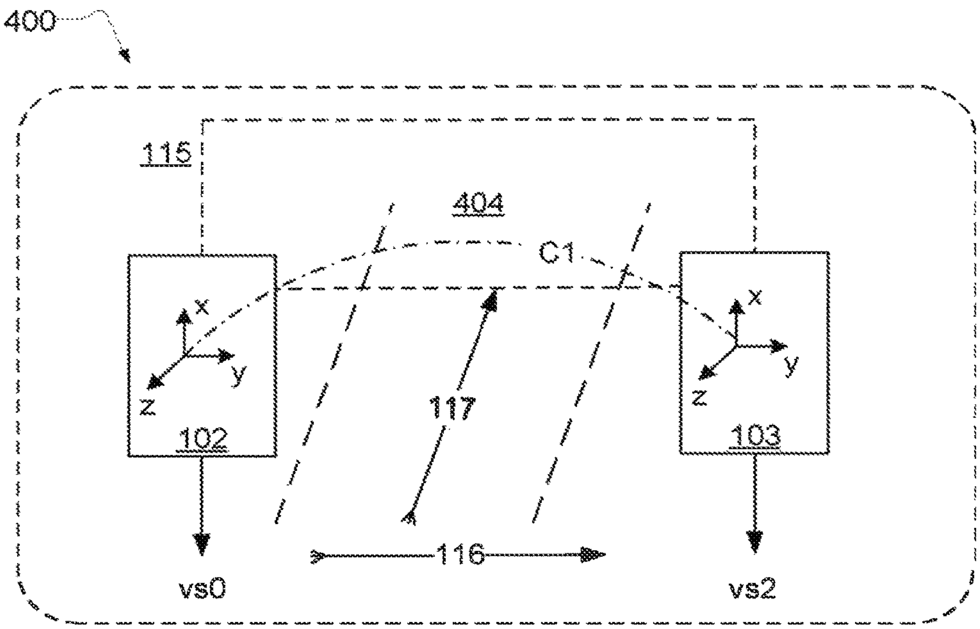
FIG. 4 illustrates magnetometers of a theft-preventing system, e.g. installed at a fitting room area, including a first magnetometer and a second magnetometer.

FIG. 4 illustrates an example of a system of magnetometers of a theft-preventing system, e.g. installed at a fitting room area, comprising a first magnetometer and a second magnetometer. The system 400 of magnetometers includes a first magnetometer 102 and a second magnetometer 103. The system 400 may be used in connection with e.g. one or both of an entrance area and a fitting room.

For this system 400 of magnetometers, the signal processor is configured to compute values of parameters, of a first multi-dimensional transformation, C1, and to generate a compensated second vector signal from the second vector signal, vs2, the first vector signal, vs0, and the first transformation, C1. The transformation C1 is illustrated by a dashed line designated C1. Thus, the first magnetometer 102 may itself serve as a magnetometer of a 'gate' or at a fitting room.

Figure 5:
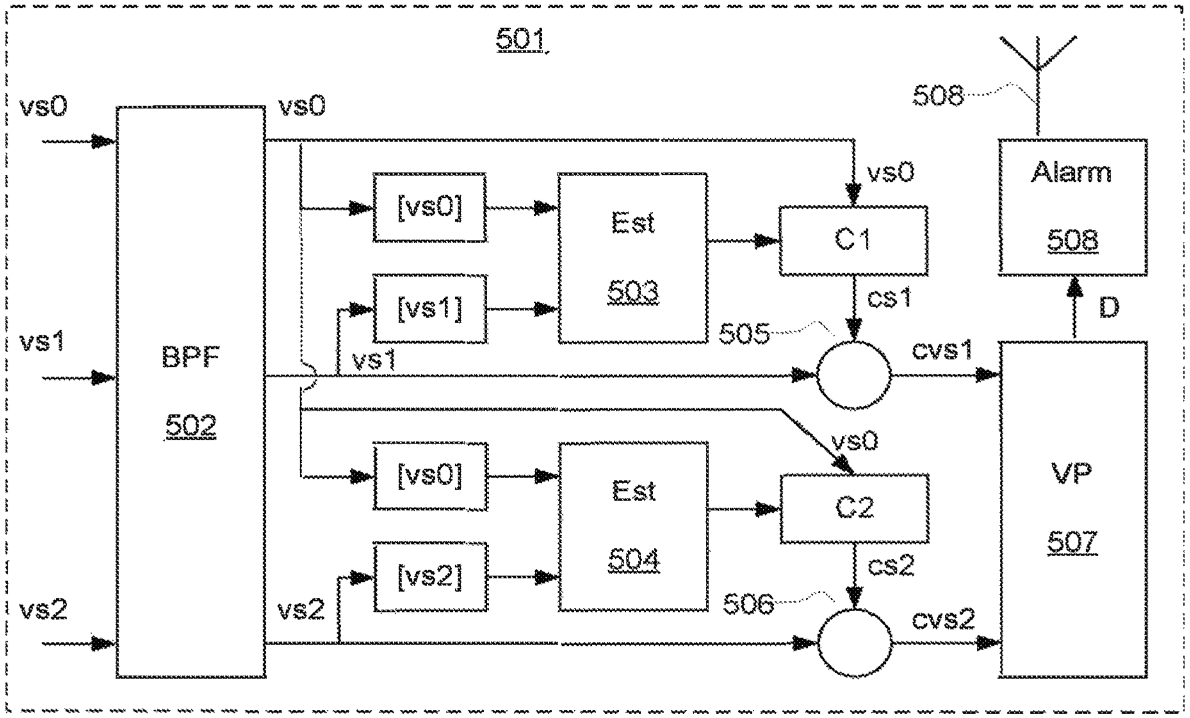
FIG. 5 shows a first block diagram of a signal processor of a theft-preventing system.

FIG. 5 shows a first block diagram of an example of a signal processor of a theft-preventing system. The first block diagram may be implemented by a portion of hardware and/or software of the signal processor. The signal processor 501 is coupled to receive the first vector signal, vs0, the second vector signal, vs1, and the third vector signal, vs3.

A band-pass filter 502 filters one or more or all of the first vector signal, the second vector signal and the third vector signal by respective band-pass filters. The respective band-pass filters have a lower cut-off frequency below about 1.0 Hz and an upper cut-off frequency above about 4 Hz and below about 50 Hz e.g. at −3 dB. The band-pass filter may effectively remove offsets corresponding to the earth's magnetic field and AC noise e.g. from electrical appliances, motors etc. with switching, rotating or reciprocating electromagnetic circuits. For the sake of simplicity the vector signals input to the band-pass filterer and output from the band-pass filter are designated by the same reference. In some embodiments the band-pass filter may be dispensed with.

Time segments of the first vector signal, vs0, the second vector signal, vs1, and the third vector signal, vs2, are stored in buffers designated [vs0], [vs1] and [vs2]. The buffers may be overwritten with recent time segments at regular time intervals e.g. every 30 seconds.

The signal processor has a first branch configured to compute a first transformation, C1, and to compute a compensated second vector signal, cvs1. Further, the signal processor has a second branch configured to compute a second transformation, C2, and to compute a compensated third vector signal, cvs2.

The first branch is based on an estimator, 'Est' 503, which is configured to determine first values of parameters, of a first multi-dimensional transformation, C1, in accordance with optimization of a difference between the second vector signal, vs1, and a first compensation signal, cs1; wherein the first compensation signal is generated from a transformation of the first vector signal, vs0, in accordance with the first multi-dimensional transformation, C1. More particularly, the estimator is configured to optimize the following expression in accordance with an optimization algorithm e.g. the L-BFGS (Low memory Broyden-Fletcher-Goldfarb-Shanno) algorithm.

$$e_n = (vs_n - C_n \cdot vs_{n=0})^2 + (1/k) * \sum_{i=1}^{3} \sum_{j=1}^{3} |C_{n_{i,j}}|$$

Wherein $vs_n$, is a vector signal (Nx3 matrix; wherein N is the number of samples in the buffer) e.g. from the second vector signal, vs1; $vs_{n=0}$ (Nx3 matrix) is the first vector signal, vs0; k is a constant; $C_n$ is a 3×3 transformation matrix; i and j are summation variables; and |..| designates the 1-norm.

The transformation transforms a 3D representation of a first vector to a 3D representation of a second vector. The transformation may have parameters representing one or both of rotation and scale. The parameters of the transformation may be stored in one or more variables e.g. in an array as it is known in the art. The signal processor may forgo memory operations related to all elements of a 3×3 matrix e.g. if the transformation includes 5 non-zero parameters Here, optimization may be minimization of e. The above expression is optimized iteratively to minimize $e_n$ when summing over values stored in the buffers (summation over values in the buffers is not shown in the expression above). The last term of the expression above is a so-called L1 regularization. Regularization penalizes relatively large values of the parameters of the transformation, $C_n$, compared to relatively small values of the parameters of the transformation. The regularization prevents or inhibits overfitting. Alternative, to L1 regularization other types of regularization may be applied.

A stopping criterion as it is known in the art may be applied to obtain values of the transformation after a predefined number of iterations or after a predetermined period of time or when a threshold value of $e_n$ is reached.

The transformations, e.g. C1 may be computed in other ways e.g. using other optimization algorithms e.g. selected from the class of steepest descent algorithms.

In response to values of the transformation, C1, being available, following the above iterative computation, the signal processor may generate a compensated second vector signal, cvs1, from the second vector signal, vs1, and the first compensation signal, cs1, which is generated from a transformation of the first vector signal, vs0, in accordance with the first multi-dimensional transformation, C1, which was made available following the iterative computation. The compensated second vector signal, cvs1, may be generated by a summation unit 505 computing the difference between the second vector signal, vs1, and the first compensation signal, cs1. The difference may be computed as a conventional difference or in another way.

The second branch is based on an estimator, 'Est' 504, and operates as described above.

The compensated second vector signal, cvs1, and the compensated third vector signal, cvs2, generated from the first branch and the second branch, respectively, are input to a vector processor, 'VP', 707. The vector processor 507 receives the vector signals, processes the vector signals and generates a detector signal (D). The vector processor 507 may operate as described in more detail in EP 2997557 B2 or PCT/EP2018/077148. Thus, rather than receiving uncompensated vector signals as described in EP 2997557 B2 and PCT/EP2018/077148, compensated vector signals as described herein are input to the vector processor.

The detector signal, D, is input to an alarm unit, which determines that the detector signal meets a predefined criterion. The predefined criterion may be that alarms are enabled by an enable signal and that the detector signal makes a predefined transition or reaches a predefined threshold. In response to at least the determining that the detector signal meets the predefined criterion, the alarm unit 508 raises or forgoes to raise an alarm that warns about a possible theft-related event.

The alarm may be communicated, via wireless transmissions means such as a radio circuit 508, to a mobile device e.g. to be carried by a shop attendant.

In another example, the signal processor 501 is coupled to receive the first vector signal, vs0, the second vector signal, vs3, and the third vector signal, vs4. In other examples, the signal processor is coupled to receive the first vector signal, vs0; the second vector signal, vs3; the third vector signal, vs4; the fourth vector signal, vs5; and the fifth vector signal, vs6. The signal processor is configured to process the vector signals with the necessary modifications. One or more or all, but the first vector signal, may be processed to generate compensated vector signals.

Figure 6:
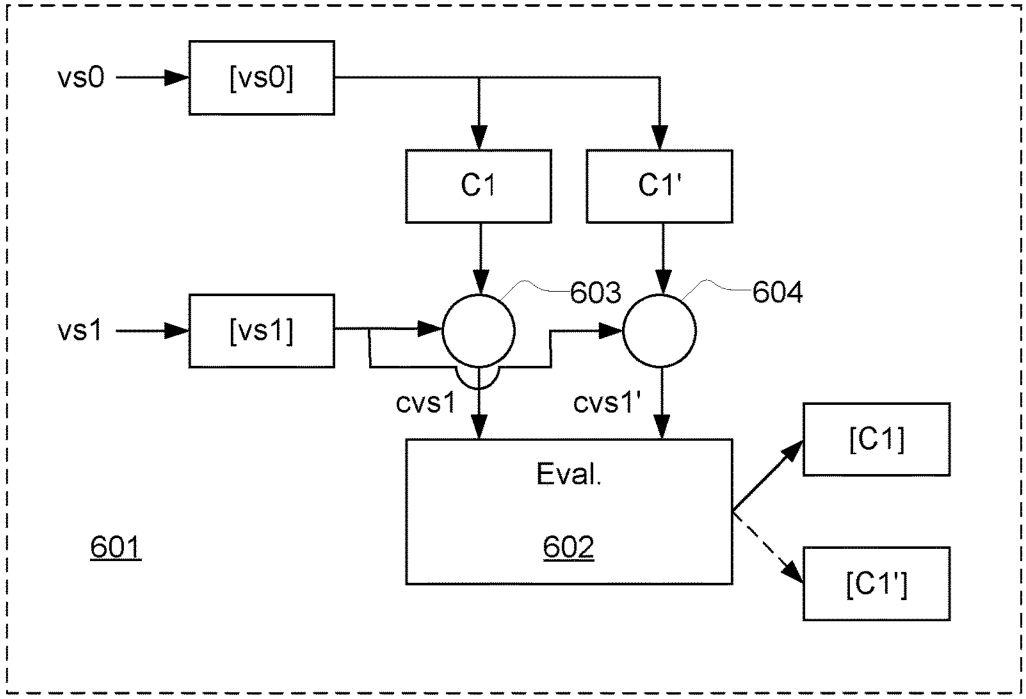
FIG. 6 shows a second block diagram of a signal processor of a theft-preventing system.

FIG. 6 shows a second block diagram of a signal processor of a theft-preventing system. The second block diagram may be implemented by a portion of hardware and/or software of the signal processor. The signal processor 601 may be a portion of or interconnected with the signal processor 501. The signal processor 601 is configured to evaluate values of the first transformation during the course of time.

Time segments of the first vector signal, vs0 and the second vector signal, vs1, are stored in buffers designated [vs0] and [vs1]. The buffers may be overwritten with recent time segments at regular time intervals e.g. every 30 seconds or every 180 seconds or at other time intervals.

As described above, values of parameters of the first transformation, C1, may be computed by an iterative algorithm. Firstly, C1 has been computed during the course of a time segment, TS1, and made available at a first time, T1 (see FIG. 7). As also described above, the compensated second vector signal, cvs1, may be generated via summation units 603 and 604. The compensated second vector signal, cvs1, is input to an evaluator, 'Eval', 602. Secondly, at a later point in time, T2, values of the parameters of the first transformation are computed anew as represented by C1', which has been computed during the course of a time segment, TS2, and made available at the second time, T2 (see FIG. 7). The compensated second vector signal, cvs1', based on the transformation C1' may be generated. The compensated second vector signal, cvs1', is also input to the evaluator, 'Eval', 602. Thus, the evaluator, 602, receives the compensated second vector signal, cvs1 and the compensated second vector signal, cvs1'.

The evaluator 602 may evaluate the two versions of the compensated second vector signal to determine which first transformation, C1 or C1', to use for computing the compensated second vector signal for at least some future time segments.

The evaluator 602 may evaluate the two versions of the compensated second vector signal e.g. in accordance with the below expression computed for cvs1 and cvs1':

$$|Sig| = \sum_{i=1}^{M} \sqrt{x_i^2 + y_i^2 + z_i^2}$$

wherein Sig represents a measure of signal strength; |..| represents the 1-norm; M, e.g. M=600, represents a number of samples in a time segment, $x_i$ $y_i$ and $z_i$ represent respectively three sample values at a time or sample instance i, one per dimension of three mutually orthogonal dimensions e.g. x, y and z.

The evaluator 602 may determine, by comparison of the respective values of |Sig| that C1' results in a lower signal strength and accordingly determine to replace C1 by C1' for at least some future time segments. Alternatively, the evaluator 602 may determine, by comparison of the respective values of 'Sig' that C1 results in a lower signal strength and accordingly determine to keep C1 for at least some future time segments, rather than replacing C1 by C1' for the computation of a compensated vector signal.

The above evaluation may be performed on a recurring basis in accordance with predefined timing e.g. at times T1, T2, T3 etc. For the sake of saving memory, C1 may contain a presently used transformation for the computation of a compensated vector signal, whereas C1' may represent a most recent candidate transformation. Thus, despite C1 was computed from time segments previous to the ones stored in the buffers [vs0] and [vs1], C1 is compared to C1', which is computed from the time segments stored in the buffers [vs0] and [vs1]. The buffers [vs0] and [vs1] contain concurrent time segments of the first vector signal, vs0, and the second vector signal, vs1.

Figure 7:
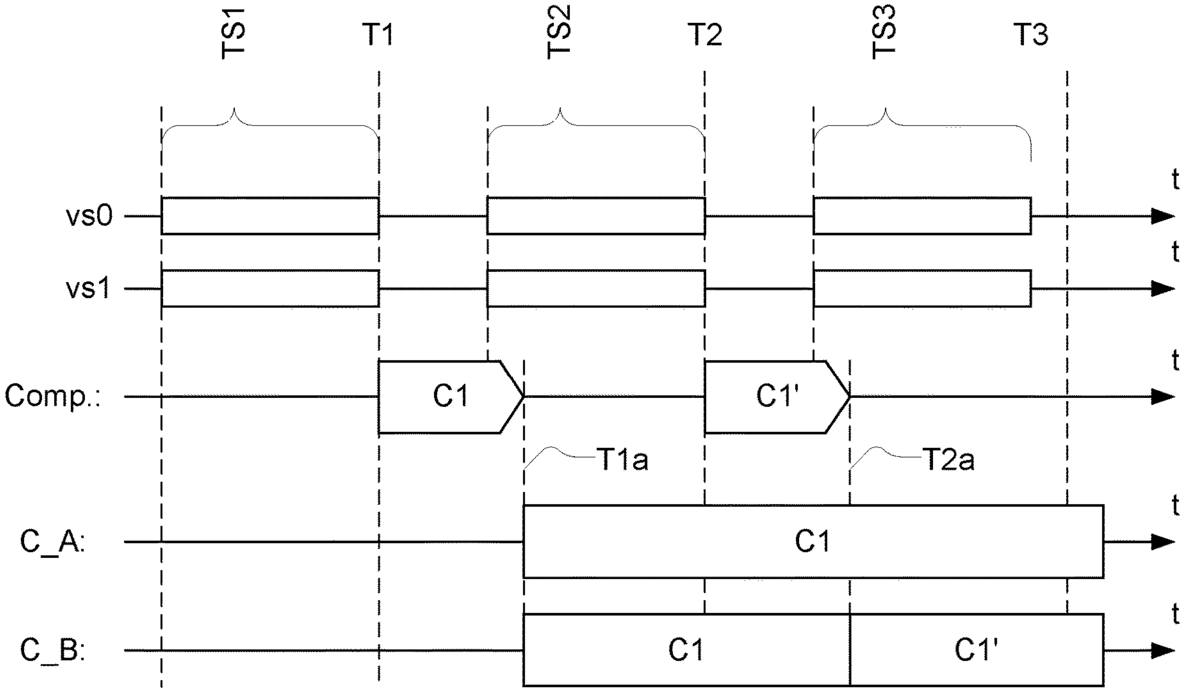
FIG. 7 shows a timing diagram for estimation and use of estimated parameters of a transformation.

FIG. 7 shows a timing diagram for estimation and use of estimated parameters of a transformation. The time diagram is shown as a function of time, t. The first vector signal vs0 and the second vector signal vs1 are shown over time and particularly over time segments TS1, TS2 and TS3 lapsing at times T1, T2 and T3, respectively.

It is also shown that computation 'Comp.' of the first values of the first parameters of the first transformation takes place as illustrated by a pointed box designated C1, from T1 to T1*a* and is made available at a first time T1*a*, following T1. Later, computation, anew, of the first values of the first parameters of the first transformation takes place as illustrated by a pointed box designated C1', from T2 to T2*a* and is made available at a first time T2*a*, following T2.

The signal processor may determine, as described above, that C1 is favoured over C1' and continue to use C1. This is shown with respect to label 'C_A' Alternatively, the signal processor may determine, as described above, that C1' is favoured over C1 and use C1' rather than C1; as shown with respect to label 'C_B'.

The signal processor may be configured to process a pair of vector signals e.g. vs0 and vs1 or to process multiple vector signals concurrently using the disclosure provided above. For instance the signal processor 501 may dispense with the second branch to include the first branch.

There is also provided an electronic theft-preventing system, including:

a first magnetometer (101) arranged in a first station at a first position and configured to output a first vector signal (vs0) representing movement of a first magnetic field vector;

a second magnetometer (102; 104) arranged in a second station at a second position and configured to output a second vector signal (vs1; vs3) representing movement of a second magnetic field vector; and a signal processor (501) coupled to receive the first vector signal (vs0) and the second vector signal (vs1), and configured to:

- determine a first value of a parameter, of a first transformation (C1), in accordance with optimization of a difference between the second vector signal (vs1) and a first compensation signal (cs1); wherein the first compensation signal is generated from a transformation of the first vector signal (vs0) in accordance with the first transformation (C1);
- generate a compensated second vector signal (cvs1) from the second vector signal (vs1) and the first compensation signal (cs1);
- determine that a detector signal (D), which is responsive to the compensated second vector signal, meets a predefined criterion; and
- in response to at least the determining that the detector signal meets the predefined criterion, raising or forgo raising a first alarm that warns about a possible theft-related event.

The above electronic theft-preventing system may be configured with magnetometers of a 1-dimensional type and the first transformation may be a 1-dimensional transformation such as a multiplication or summation. Such an electronic theft-preventing system may be installed with the first magnetometer and the second magnetometer arranged with substantially same orientation. The electronic theft-preventing system may be installed with the first magnetometer and the second magnetometer arranged with an orientation that is different from a mutually orthogonal orientation. The magnetometers may be arranged with a mutual orientation that is less than about 60 degrees, e.g. less than about 45 degrees. In some embodiments the second station comprises multiple 1-dimensional magnetometers arranged along a substantially vertical axis e.g. in an elongated, vertical or erect body or stand mounting for fixation on a wall. Embodiments of the above electronic theft-preventing system comprising 1-dimensional magnetometers are defined in the dependent claims and in the summary section, wherein mentioned multi-axis magnetometer may be replaced by a 1-dimensional magnetometer and/or a 1-dimensional transformation.

In some embodiments the multi-axis magnetometers are 2-dimensional magnetometers. The electronic theft-preventing system may be installed with the first magnetometer and the second magnetometer arranged with an orientation that is different from a mutually orthogonal orientation. The magnetometers may be arranged with a mutual orientation that is less than about 60 degrees, e.g. less than about 45 degrees. The 2-dimensional magnetometers may each have substantially orthogonal axes.

From the above, it is made clear that it is enabled to more reliably detect theft related events and to at least reduce the risk of generating false alarms or failing to raise an alarm at times when the alarm should have been raised.

The invention claimed is:

1. An electronic theft-preventing system, comprising:
- a first multi-axis magnetometer arranged in a first station at a first position and configured to output a first vector signal representing movement of a first magnetic field vector;
- a second multi-axis magnetometer arranged in a second station at a second position and configured to output a second vector signal representing movement of a second magnetic field vector; and
- a signal processor coupled to receive the first vector signal and the second vector signal, and configured to:
  - determine values of parameters of a multi-dimensional transformation, in accordance with optimization of a difference between the second vector signal and a compensation signal, wherein the compensation signal is generated from a transformation of the first vector signal in accordance with the multi-dimensional transformation;
  - generate a compensated second vector signal from the second vector signal and the first compensation signal;
  - determine that a detector signal, which is responsive to the compensated second vector signal, meets a predefined criterion; and
  - in response to at least the determining that the detector signal meets the predefined criterion, raising or forgo raising an alarm that warns about a possible theft-related event.

2. The electronic theft-preventing system according to claim 1, wherein the values of the parameters of the multi-dimensional transformation are determined on a recurring basis in accordance with first timing.

3. The electronic theft-preventing system according to claim 2, wherein the difference between the second vector signal and the compensation signal is determined over concurrent time segments of the first vector signal and the second vector signal or portions of the concurrent time segments; and
- wherein the compensated second vector signal is generated from the second vector signal at times subsequent to the concurrent time segments and in accordance with the values of the parameters determined anew on the recurring basis.

4. The electronic theft-preventing system according to claim 1 comprising:
- a third multi-axis magnetometer arranged in a third station and configured to output a third vector signal representing movement of a third magnetic field vector;
- wherein the signal processor is further configured to:
  - determine second values of parameters of a second multi-dimensional transformation in accordance with optimization of a difference between the third vector signal and a second compensation signal;
  - wherein the second compensation signal is generated from a transformation of the first vector signal in accordance with the second multi-dimensional transformation;
  - generate a compensated third vector signal from the third vector signal and the second compensation signal; and
  - wherein the detector signal is responsive to the compensated third vector signal.

5. The electronic theft-preventing system according to claim 1 comprising:
- a fourth multi-axis magnetometer arranged in a fourth station and configured to output a fourth vector signal representing movement of a fourth magnetic field vector; wherein the signal processor is further configured to:
  - determine third values of parameters of a third multi-dimensional transformation in accordance with optimization of a difference between the fourth vector signal and a third compensation signal;
- wherein the third compensation signal is generated from a transformation of the first vector signal in accordance with the third multi-dimensional transformation;
- generate a compensated third vector signal from the third vector signal and the third compensation signal; and
- wherein the detector signal is responsive to the compensated third vector signal.

6. The electronic theft-preventing system according to claim 5, wherein the signal processor is further configured to:
- band-pass filter one or more or all of the first vector signal, the second vector signal, the third vector signal, and the fourth vector signal by respective band-pass filters, wherein the respective band-pass filters have a lower cut-off frequency below 1.0 Hz and an upper cut-off frequency above 4 Hz and below 50 Hz.

7. The electronic theft-preventing system according to claim 5, wherein one or more or all of: the multi-dimensional transformation, the second multi-dimensional transformation, and the third multi-dimensional transformation are estimated in accordance with a regularization, applied during iterative estimation of parameters of the multi-dimensional transformation, second parameters of the second multi-dimensional transformation, and third parameters of the third multi-dimensional transformation, respectively, penalizing relatively large parameters of the parameters of the multi-dimensional transformation, the second multi-dimensional transformation, and the third multi-dimensional transformation, respectively, compared to relatively small parameters of the parameters of the multi-dimensional transformation, the second multi-dimensional transformation, and the third multi-dimensional transformation, respectively.

8. The electronic theft-preventing system according to claim 1, wherein:

the first vector signal is acquired at a first time segment and a second time segment and the second vector signal is acquired at the first time segment and the second time segment;

the parameters are estimated a first time from the first vector signal and the second vector signal at the first time segment;

the parameters are estimated a second time from the first vector signal and the second vector signal at the second time segment;

the compensated second vector signal is generated at times following the second time in accordance with the parameters, estimated at the first time, subject to a first criterion;

the compensated second vector signal is generated at times following the second time in accordance with the parameters, estimated at the second time subject to a second criterion.

9. The electronic theft-preventing system according to claim 8, wherein the first criterion is fulfilled when the compensated second vector signal generated from the second vector signal at the first time segment in accordance with the parameters estimated at the second time has a lower strength than the compensated second vector signal generated from the second vector signal at the first time segment in accordance with the parameters estimated at the first time.

10. The electronic theft-preventing system according to claim 1, wherein:

at a first time: the parameters are estimated based on: the first vector signal at a first time segment, the second vector signal at the first time segment and the compensation signal at the first time segment, wherein the compensation signal at the first time segment is generated from the parameters estimated the first time and the first vector signal at the first time segment;

at a second time: the parameters are estimated based on: the first vector signal at a second time segment, the second vector signal at the second time segment and the compensation signal at the second time segment; and the compensation signal is generated from the parameters estimated at the second time and the first vector signal at the second time segment;

a first compensated second vector signal is generated from the second vector signal at the second time segment and the compensation signal is generated from the first parameters estimated the first time and the first vector signal at the second time segment;

a second compensated second vector signal is generated from the second vector signal at the second time segment and the compensation signal is generated from the first parameters estimated the second time and the first vector signal at the second time segment;

the signal processor being further configured to:

evaluate the first compensated second vector signal and the second compensated second vector signal, and determine that the first compensated second vector signal is favored over the second compensated second vector signal, and generate the compensated second vector signal in accordance with the parameters estimated at the first time and forgo to generate the compensated second vector signal in accordance with the first parameters estimated at the second time.

11. The electronic theft-preventing system according to claim 1, wherein the signal processor is further configured to:

perform the detection of a corresponding movement of the first magnetic field vector and the second magnetic field vector by:

estimating a first rotation of the first magnetic field vector and a second rotation of the second magnetic field vector;

generating an indicator signal comprising indication of a counter-direction rotation or a same-direction rotation;

determining whether to enable the alarm in response to at least the indicator signal.

12. The electronic theft-preventing system according to claim 1, wherein the signal processor is further configured to:

detect a corresponding movement of the first magnetic field vector and the second magnetic field vector;

subsequent to the detecting of a corresponding movement of the first magnetic field vector and the second magnetic field vector, detecting commencement and continuance of fluctuation of at least the first magnetic field vector or the second magnetic field vector; wherein continuance of the fluctuation is determined in accordance with a first timing criterion;

determining whether to raise or forgo to raise the alarm that warns about a possible theft-related event in response to at least the determining of commencement and continuance of fluctuation of at least the first magnetic field vector or the second magnetic field vector.

13. The electronic theft-preventing system according to claim 11, wherein detection of a corresponding movement of the first magnetic field vector and the second magnetic field vector comprises:

determining whether movement of the first magnetic field vector and the second magnetic field vector corresponds to a substantially horizontal movement of a magnet between the first station and the second station.

14. The electronic theft-preventing system according to claim 11, wherein detecting continuance of fluctuation comprises:

determining whether movement of one or both of the first magnetic field vector and the second magnetic field vector corresponds to an oscillating movement of a magnet in proximity of one or both of the first station or in proximity of the second station.

15. A method of detecting a theft-related event using a system comprising:

a first multi-axis magnetometer arranged in a first station and configured to output a first vector signal representing movement of a first magnetic field vector;

a second multi-axis magnetometer arranged in a second station and configured to output a second vector signal representing movement of a second magnetic field vector; and a signal processor coupled to receive the first vector signal and the second vector signal the method comprising:

estimating a multi-dimensional transformation, which represents a difference between the first magnetic field vector and the second magnetic field vector, and which is estimated over periods of time in accordance with optimization of a difference between the first vector signal and the second vector signal;

compensating the second vector signal in response to a compensation signal generated from a transformation of the second vector signal defined by the multi-dimensional transformation;

determining that a detector signal, which is responsive to the second vector signal that has been compensated, meets a predefined criterion; and in response to at least the determining that the detector signal meets the predefined criterion, raising or forgo raising an alarm that warns about a possible theft-related event.

16. The electronic theft-preventing system according to claim 12, wherein detection of a corresponding movement of the first magnetic field vector and the second magnetic field vector comprises:

determining whether movement of the first magnetic field vector and the second magnetic field vector corresponds to a substantially horizontal movement of a magnet between the first station and the second station.

17. The electronic theft-preventing system according to claim 12, wherein detecting continuance of fluctuation comprises:

determining whether movement of one or both of the first magnetic field vector and the second magnetic field vector corresponds to an oscillating movement of a magnet in proximity of one or both of the first station or in proximity of the second station.

18. The electronic theft-preventing system according to claim 13, wherein detecting continuance of fluctuation comprises:

determining whether movement of one or both of the first magnetic field vector and the second magnetic field vector corresponds to an oscillating movement of a magnet in proximity of one or both of the first station or in proximity of the second station.

* * * * *